Patented Jan. 10, 1950

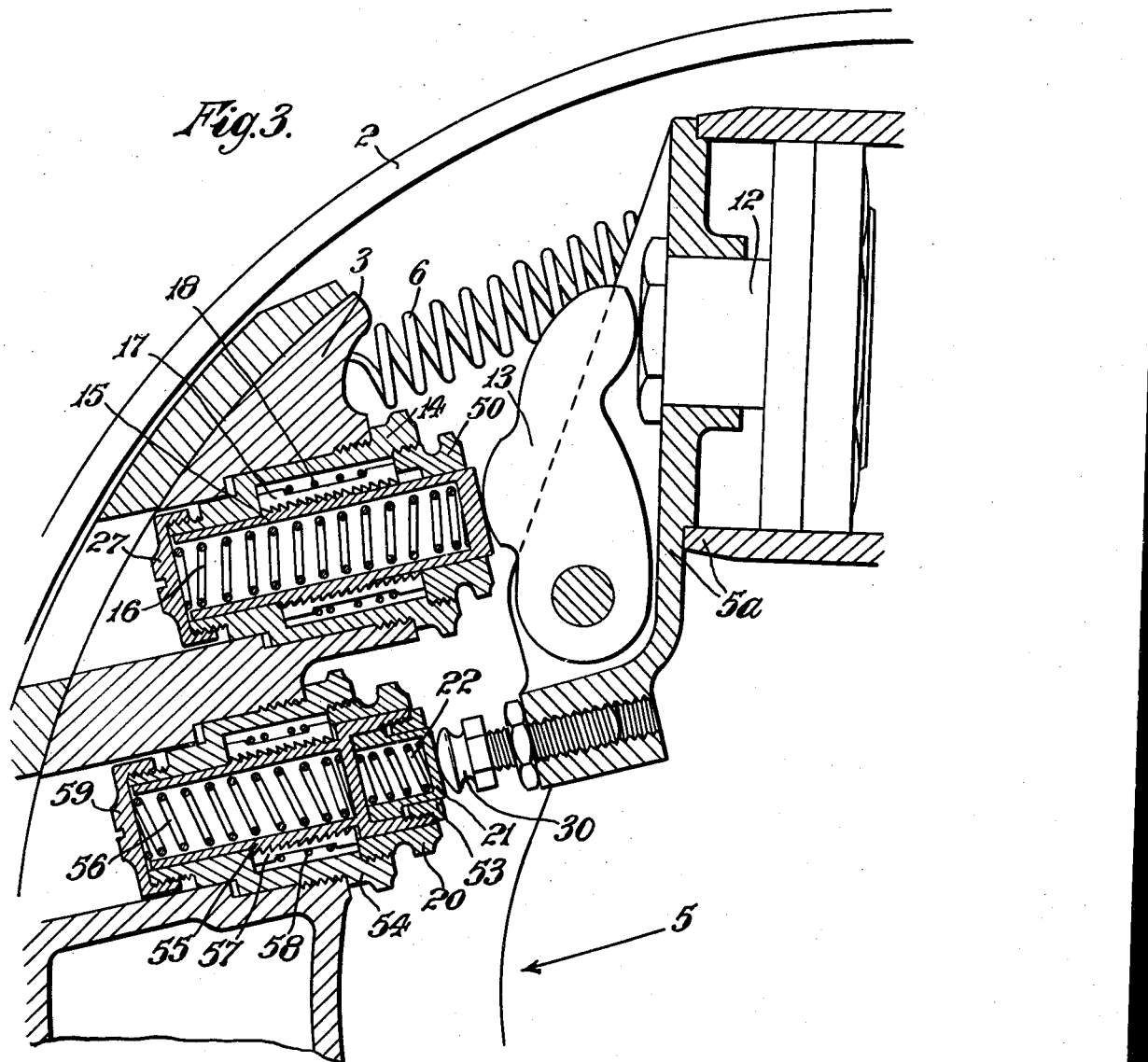

2,493,993

UNITED STATES PATENT OFFICE 2,493,993

AUTOMATIC BRAKE ADJUSTER

Fred Neale, Coventry, England

Application June 19, 1945, Serial No. 600,283
In Great Britain July 6, 1944

2 Claims. (Cl. 188—79.5)

This invention relates to mechanisms of the types exemplified in wheel and transmission brakes in which one or more brake shoes or friction members carried by a stationary part are adapted to be moved into frictional engagement with a rotatable part, such as a drum.

In mechanism of the type referred to means for limiting the operational movements of brake shoes and their operating means have become desirable to prevent the necessity for adjustment due to many factors including varying conditions of heat, the limitation of permissible movement of one or more prime moving elements of a brake shoe operating means, a tendency of a brake shoe to drag in its drum after application means thereof have been retracted, faulty brakeshoe adjustment, faulty operation of automatic means of adjustment and wear of parts particularly the frictional surfaces of brake shoe and drum.

The present invention has for its principal object the provision of an improved automatic adjusting device between a brake shoe and its carrier and between the brake shoe and its operating means whereby the operational movements of the brake shoe operating means are automatically constrained within predetermined limits and an adequate clearance between the drum and the brake shoe in its retracted position is assured.

A further object of this invention is to reduce to a minimum the amount of fluid required to operate brakes utilizing fluid pressure for their application, and means accordingly are provided by the application of automatic means of adjustment whereby the amount of movement of certain brake shoe application parts, such as pistons, is restrained within predetermined limits.

Figure 3 shows a sectional view of an automatic means of adjustment used between the brake shoe and its operating means, and a sectional view of a combined unit comprising a means of automatic adjustment and a lost motion means used between the brake shoe and its carrier.

Figure 1:
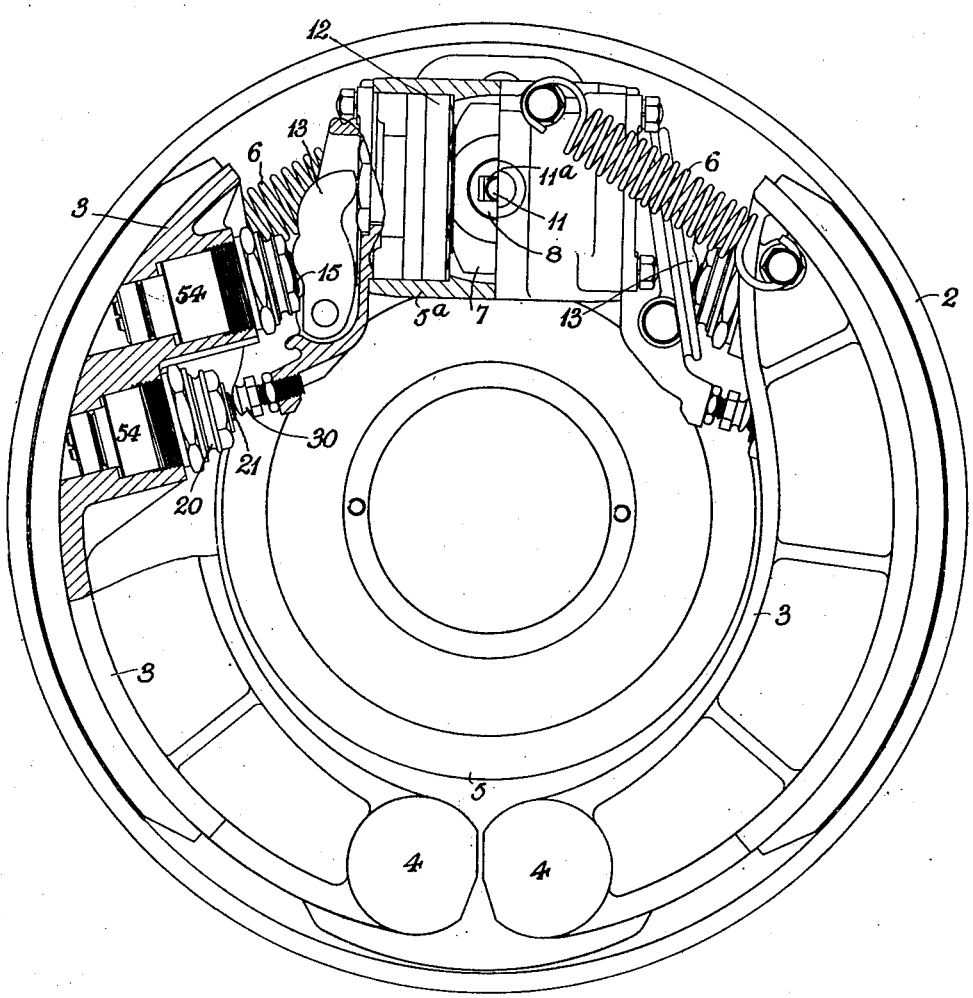
Figure 1 is a front view partly in section, of brake mechanism of the kind herein referred to embodying the present invention.
Figure 2:
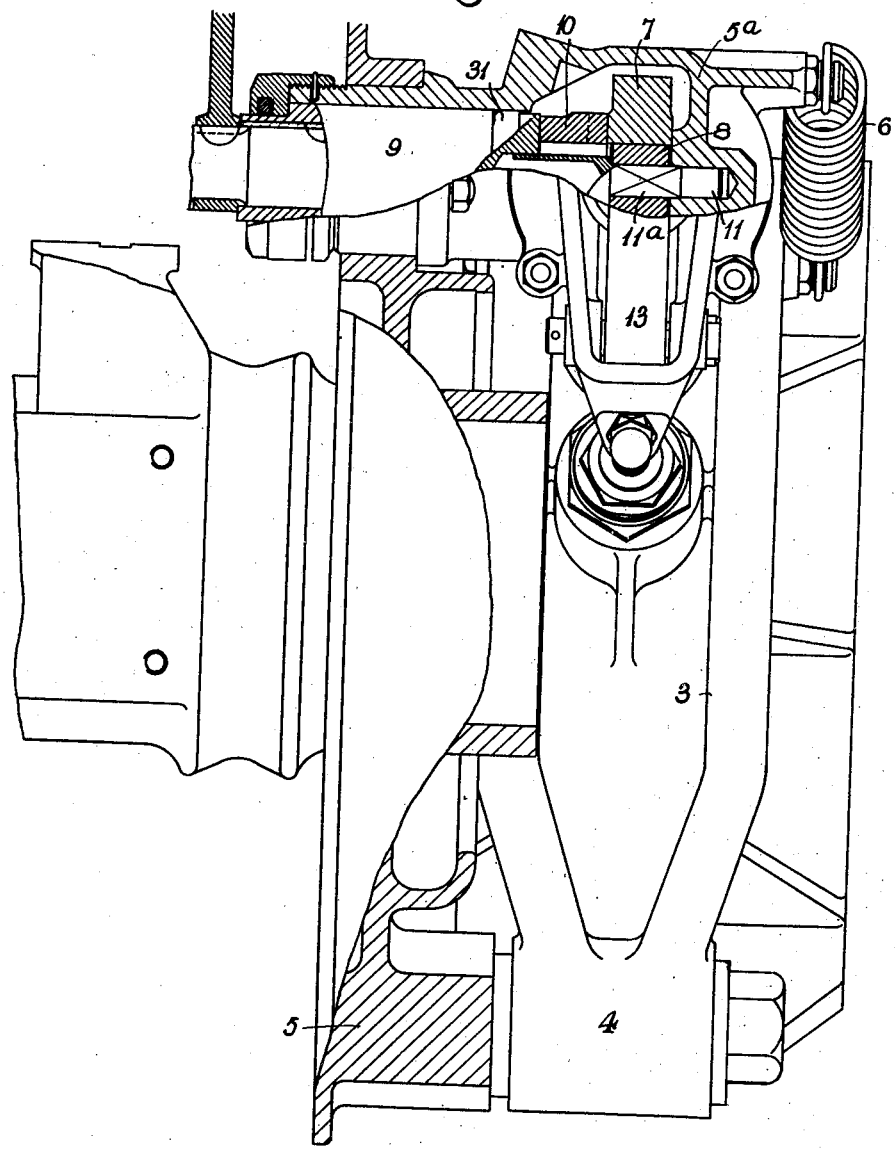
Figure 2 is a view, also partly in section, of the same at right angles to Figure 1.

Referring to the drawings, 2 represents a rotatable drum and 3, 3 the brake shoes, which are pivoted at 4, 4 in a stationary carrier 5, and are adapted to be moved into frictional engagement with the drum by means to be described and to be retracted and maintained out of such engagement by springs 6, 6 anchored at their ends to the brake shoes and brake shoe carrier respectively.

The means by which the brake shoes are moved about their pivots into frictional engagement with the drum may, as shown, consist of a cam 7 which is rotatably mounted in a bush 8 having a rectangular hole slidably engaging a squared portion 11ᵃ of a shaft 11 fast in a housing 5ᵃ in the carrier 5 to permit of lateral movement of the cam for equalising the pressures of the brake shoes on the drum, adapted to be rotated by a shaft 9 carried rotatably in the housing 5ᵃ through an Oldham coupling 10, and further adapted to impart rectilinear movement to pistons 12 relative to the housing 5ᵃ carrying them thereby actuating levers 13 carried rotatably in the housing 5ᵃ and adapted to move the shoes 3 to the drum 2 through the medium of automatic means of adjustment, to be described, carried by the shoes 3.

Pistons 12 in their retracted positions abut the housing 5ᵃ and may be moved therefrom to apply the shoes 3 to the drum 2, alternatively or additionally, as shown by fluid pressure admitted to the housing 5ᵃ and between the pistons 12 and shaft 9 being provided with sealing means as at 31.

Automatic means of adjustment between the levers 13 and shoes 3 may, as shown in Figure 3, comprise a ratchet shaft 15 carried by and adapted to slide in the housing 14, which is screwed into the shoe 3. Under the resilient pressure of the spring 16 abutting the cap 27, which is screwed on the housing 14, the shaft 15, against the resistance of the ratchet segments 17, normally held in engagement therewith by a spring 18, is adapted to slide towards the lever 13. The segments 17 which are also carried in the housing 14 are restrained from substantial axial movement therein by abutment on the housing 14 and a nut 50 screwing therein.

This arrangement provides an automatic one-way take-up device and is such that as the ratchet shaft 15 is urged through the ratchet segments 17 by the spring 16 towards the lever 13 the segments are moved radially outwards against the spring 18 and such movement of the ratchet shaft 15 is restrained by abutment of the lever 13 on the piston 12. Axial movement of the ratchet shaft 15 in a direction opposite to that referred to is constrained to that necessary to cause abutment between the perpendicular faces of the co-operating ratchet teeth of the shaft 15 and segments 17. Thus, as wear of the brake frictional surfaces occurs and the shoe 3 in its retracted position recedes further from the centre of drum rotation, the automatic extensible characteristics of the means described are such that as the piston 12 is retracted to its stop in the housing 5ᵃ thereby or in combination with other means, and as the extension of length of the adjustment means is positively irretractile, the piston movement necessary to apply the shoe to the drum is positively maintained below a certain amount.

Means for constraining operational movements of the brake shoes 3 between predetermined limits regardless of wear of the frictional surfaces may, according to this invention, be, where automatic means of adjustment, as described, are combined with retractable means of abutment, between the shoe 3 and carrier 5, such as is shown in Figure 3 where the ratchet shaft 55, carried by the housing 54 screwed in the shoe 3 and cooperating with resiliently restrained radially outwardly movable segments 57 which are also restrained from substantial axial movement between abutments on the housing 54 and its associated nut 20, carries an abutment element 21 which is adapted to be urged towards abutment with the stop 30 of manually adjustable means associated with the carrier 5 by the spring 22. The spring 22 is more heavily loaded than the spring 56 which is loaded by the cap 59 screwing into the housing 54 to urge the ratchet shaft 55 through ratchet segments 57 which are urged radially into ratchet engagement therewith by the spring 58. The spring 22 also urges the abutment element 21 to abutment with the cap 53 screwing into an extension of the ratchet shaft 55, the abutment element 21 being further adapted to be urged to an abutment on the ratchet shaft 55 by the pressure exerted on it by the stop 30 as the shoe is forced thereto by retraction springs 6, which are adequate to overcome all resistance to shoe retraction when the application pressure thereon has been released.

The arrangement is such that as long as the operational movements of the shoe 3 are below a certain amount no irretractile movement of the ratchet shaft 55 occurs relative to the ratchet segments 57, but the shoe 3 in its movement from contact with the drum to its retracted position must move the abutment element 21 from abutment on the cap 53 to abutment on the ratchet shaft 55 after the co-operating perpendicular faces of the ratchet teeth of the shaft 55 and segments 57 have abutted. When the shoe 3 is moved towards the drum 2 from its retracted position the abutment element 21 is first moved from its abutment on the ratchet shaft 55 to its abutment on the cap 53 by the spring 22 thereby permitting the spring 56 to urge the ratchet shaft 55 through the ratchet segments 57, as described, so that after sufficient wear of the brake frictional surfaces has occurred the movement of the shaft 55 through the segments 57 is sufficient for the ratchet action to occur thereby preventing the shaft 55 from retracting to its original position relative to the segments 57 and extending the distance from the frictional surface of the shoe to the abutment of the element 21 on the ratchet shaft 55. This reduces the distance to be retracted by the shoe, but the amount of retraction of the shoe 3 from its contact with the drum must be that necessary to move the element 21 from the abutment or cap 53 to the abutment or ratchet shaft 55 thereby assuring clearance between the fully retracted shoe 3, and the drum 2.

From the foregoing it will be seen that a brake having the improved characteristics herein described is perpetually maintained in adjustment without recourse to manual attention during the life of the brake shoes or their frictional linings regardless of which source of operating power is used or of the degree of unequal wear of the braking surfaces.

I claim:

1. In a brake mechanism, a brake shoe member, and a cooperating brake member, one of said members being provided with an axially bored portion relatively immovable with relation to said member, the bore of said portion being counterbored to a larger diameter for a part of its length, in combination with a nut screwing into the counterbored part of said bore, said nut having a bore therein coaxial with the bore of said portion, an axially movable hollow plunger formed with an internal abutment and having external ratchet teeth and slidably mounted in the bores of said portion and nut and having an operative end extending from said nut and operatively engaging the other said member, a compression spring within said plunger, a cap secured to said bored portion and compressing said spring between its inner face and the opposed face of said abutment to urge said plunger into engagement with said other member, a plurality of annularly arranged axially extending ratchet segments disposed in the counterbored part of said bore around said plunger for cooperation with the ratchet teeth of said plunger, said nut limiting axial movement of said segments, and a radially expandible coil spring disposed coaxially about said ratchet segments and resiliently urging said segments radially inward into operative engagement with the ratchet teeth of said plunger.

2. In a brake mechanism, a brake shoe member, and a cooperating brake member, in combination with an axially bored body mounted on one of said members, the bore of said body having an enlarged portion at one end thereof, a nut screwing into the enlarged portion of said bore, said nut having a bore therein coaxial with the bore of said body, an axially movable hollow plunger formed with an internal abutment and having external ratchet teeth and slidably mounted in the bores of said body and said nut and having an operative end extending from said nut and operatively engaging the other said member, a compression spring within said plunger, a cap screwing on said body and compressing said spring between its inner face and the opposed face of said abutment to urge said plunger into engagement with said other member, a plurality of annularly arranged axially extending ratchet segments disposed in the enlarged portion of said bore of said body for cooperation with the teeth of said plunger, said nut limiting axial movement of said segments, and a radially expandible coil spring disposed coaxially about said segments and urging said segments radially inward into operative engagement with the ratchet teeth of said plunger.

FRED NEALE.

REFERENCES CITED

The following references are of record in the file of this patent:

UNITED STATES PATENTS

| Number | Name | Date |
|--------|------|------|
| 1,900,791 | Brice | Mar. 7, 1933 |
| 2,051,920 | Turgot | Aug. 25, 1936 |
| 2,057,749 | Tatter | Oct. 20, 1936 |
| 2,152,041 | Goepfrich | Mar. 28, 1939 |
| 2,175,446 | Rasmussen et al. | Oct. 10, 1939 |
| 2,205,889 | Mabrito | June 25, 1940 |
| 2,222,858 | Ryan | Nov. 26, 1940 |

FOREIGN PATENTS

| Number | Country | Date |
|--------|---------|------|
| 735,701 | France | Nov. 14, 1932 |